(12) United States Patent
Takahama

(10) Patent No.: US 11,686,632 B2
(45) Date of Patent: Jun. 27, 2023

(54) SENSOR PRESSING MEMBER

(71) Applicant: Tsunemichi Takahama, Hyogo (JP)

(72) Inventor: Tsunemichi Takahama, Hyogo (JP)

( * ) Notice: Subject to any disclaimer, the term of this patent is extended or adjusted under 35 U.S.C. 154(b) by 0 days.

(21) Appl. No.: 17/789,978

(22) PCT Filed: Dec. 10, 2020

(86) PCT No.: PCT/JP2020/046095
§ 371 (c)(1),
(2) Date: Jun. 29, 2022

(87) PCT Pub. No.: WO2021/140825
PCT Pub. Date: Jul. 15, 2021

(65) Prior Publication Data
US 2022/0390299 A1     Dec. 8, 2022

(30) Foreign Application Priority Data

Jan. 9, 2020   (JP) .................................. 2020-002092

(51) Int. Cl.
  *G01L 1/22*    (2006.01)
  *G01B 7/16*    (2006.01)
  *G01L 5/00*    (2006.01)
(52) U.S. Cl.
  CPC .............. *G01L 1/2231* (2013.01); *G01B 7/18* (2013.01); *G01L 5/0038* (2013.01)
(58) Field of Classification Search
  CPC .... G01B 7/16; G01B 7/18; G01L 1/22; G01L 1/2231; G01L 5/0038; A61B 3/16
  See application file for complete search history.

(56) References Cited

U.S. PATENT DOCUMENTS

| | | |
|---|---|---|
| 5,616,847 A | 4/1997 | Schlapfer |
| 2002/0026838 A1 | 3/2002 | Odashima |
| 2015/0135847 A1 | 5/2015 | Takahama |

FOREIGN PATENT DOCUMENTS

| | | | |
|---|---|---|---|
| CH | 706531 B1 * | 11/2013 | ............... G01B 7/16 |
| JP | 55-32468 | 8/1980 | |
| JP | 2002-82005 | 3/2002 | |
| JP | 2003532094 A * | 10/2003 | |
| JP | 2010-71657 | 4/2010 | |
| JP | 2013234899 A * | 11/2013 | |
| JP | 5541759 | 7/2014 | |
| WO | 2013/168720 | 11/2013 | |

OTHER PUBLICATIONS

International Search Report (ISR) dated Jan. 19, 2021 in International (PCT) Application No. PCT/JP2020/046095.
Written Opinion of the International Searching Authority dated Jan. 19, 2021 in International Application No. PCT/JP2020/046095 (with English translation).

* cited by examiner

*Primary Examiner* — Octavia Davis Hollington
(74) *Attorney, Agent, or Firm* — Wenderoth, Lind & Ponack, L.L.P.

(57) ABSTRACT

A sensor pressing member to which a sensor is attached such that the sensor is exposed toward a measurement target. The sensor pressing member presses the sensor in a first direction relative to the measurement target to bring the sensor into contact with the measurement target. The sensor pressing member includes an elastic body positioned opposite the measurement target with the sensor in between in the first direction. The elastic body includes a cavity therein.

7 Claims, 10 Drawing Sheets

(a)

(b)

SENSOR PRESSING MEMBER

TECHNICAL FIELD

The present invention relates to a sensor pressing member to which a sensor is attached and which presses the sensor against a measurement target.

BACKGROUND ART

A sensor pressing member to which a sensor is attached and which presses the sensor against a measurement target is conventionally widely known. For example, Patent Literature (PTL) 1 discloses a sensor holding portion (sensor pressing member) to which a strain gauge sensor is adhered via a thin plate-shaped elastic member and which presses the strain gauge sensor against the outer peripheral surface of a rotation shaft (measurement target) with a predetermined pressure regardless of the centrifugal force generated by rotation of the rotation shaft. With this configuration, in PTL 1, the strain gauge sensor can be pressed against the outer peripheral surface of the rotation shaft with appropriate pressure even when the rotation shaft is rotating.

CITATION LIST

Patent Literature

[PTL 1] Japanese Unexamined Patent Application Publication No. 2010-71657

SUMMARY OF INVENTION

Technical Problem

Unfortunately, with the conventional sensor pressing member described above, the force pressing down on the sensor may be uneven depending on the area where the sensor is pressed down, and in such cases, there is a risk that the sensor may not be able to take accurate measurements. The present invention has been conceived in view of the problem described above, and has an object to provide a sensor pressing member that can improve the measurement accuracy of a sensor.

Solution to Problem

In order to achieve the above object, a sensor pressing member according to one aspect of the present invention is a sensor pressing member to which a sensor is attached such that the sensor is exposed toward a measurement target. The sensor pressing member is configured to press the sensor in a first direction relative to the measurement target to bring the sensor into contact with the measurement target. The sensor pressing member includes an elastic body positioned opposite the measurement target with the sensor in between in the first direction. The elastic body includes a cavity therein.

The present invention can be realized not only as such a sensor pressing member, but also as a sensor unit including the sensor pressing member and the sensor described above.

Advantageous Effects of Invention

With the sensor pressing member according to the present invention, the measurement accuracy of a sensor can be improved.

DESCRIPTION OF EMBODIMENTS

Figure 1:
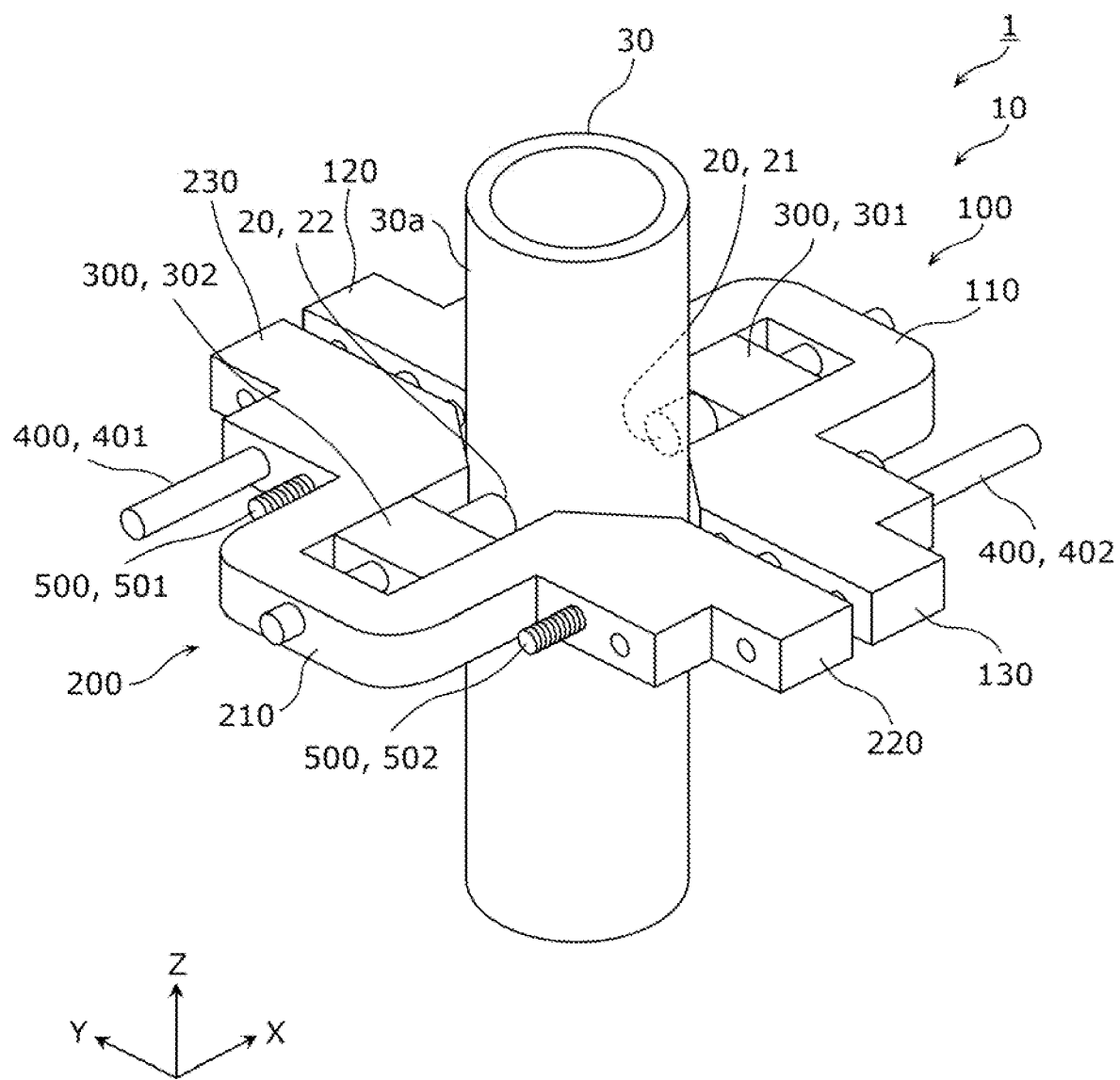
FIG. 1 is a perspective view of the external appearance of a sensor unit including a sensor pressing member according to an embodiment of the present disclosure.

With the conventional sensor pressing member described above, the force pressing down on the sensor may be uneven depending on the area where the sensor is pressed down, and in such cases, there is a risk that the sensor may not be able to take accurate measurements. Stated differently, the above conventional sensor pressing member (sensor holding portion) includes a sensor adhered via a thin plate-shaped elastic member, and when the sensor is pressed against the rotation shaft, the pressing force on the sensor may become uneven due to differences in pressing force between the center and peripheral regions of the sensor. If the force pressing down on the sensor is uneven, the pressing force may be too strong or too weak depending on the area where the sensor is pressed, and accurate measurement by the sensor may not be possible. Thus, the inventor found that the above conventional sensor pressing member may not allow the sensor to take accurate measurements.

In order to overcome the above problem, a sensor pressing member according to one aspect of the present invention is a sensor pressing member to which a sensor is attached such that the sensor is exposed toward a measurement target. The sensor pressing member is configured to press the sensor in a first direction relative to the measurement target to bring the sensor into contact with the measurement target. The sensor pressing member includes an elastic body positioned opposite the measurement target with the sensor in between in the first direction. The elastic body includes a cavity therein. Alternatively, the sensor pressing member is a sensor pressing member to which a sensor is attached. The sensor pressing member is configured to press the sensor in a first direction relative to a measurement target. The sensor pressing member includes: an elastic body positioned opposite the measurement target with the sensor in between in the first direction; and a pressing member positioned opposite the sensor with the elastic body in between in the first direction. The pressing member is configured to move the elastic body toward the measurement target and press the sensor against the measurement target. The elastic body includes a cavity therein.

With this configuration, the sensor pressing member includes an elastic body that sandwiches the sensor against the measurement target, and the elastic body includes a cavity therein. As a result, the elastic body deforms when the sensor is pressed against the measurement target by the sensor pressing member, but because there is a cavity inside the elastic body, the force that presses down the sensor can be made uniform (for example, uniform pressing force between the center and peripheral regions of the sensor). Accordingly, by using this sensor pressing member, the measurement accuracy of the sensor can be improved.

The elastic body includes a side surface in a second direction intersecting the first direction that may be recessed.

With this configuration, the side surface of the elastic body included in the sensor pressing member is recessed. By recessing the side surface of the elastic body in this manner, the side surface of the elastic body can be inhibited from protruding outward when the elastic body deforms as a result of pressing the sensor against the measurement target. With this configuration, it is possible to obtain sufficient pressing force when pressing the sensor with the sensor pressing member, achieve uniform pressing force of the sensor, and inhibit the sensor from breaking. Accordingly, by using this sensor pressing member, the measurement accuracy of the sensor can be improved.

The side surface may be recessed in a concave shape that curves in the second direction.

With this configuration, the side surface of the elastic body is recessed in a concave shape. By recessing the side surface of the elastic body in a concave shape in this manner, the side surface of the elastic body can be further inhibited from protruding outward when the elastic body deforms as a result of pressing the sensor against the measurement target. With this, by using this sensor pressing member, it possible to further improve the measurement accuracy of the sensor.

A sensor pressing member according to another aspect of the present invention is a sensor pressing member to which a sensor is attached such that the sensor is exposed toward a measurement target. The sensor pressing member is configured to press the sensor in a first direction relative to the measurement target to bring the sensor into contact with the measurement target. The sensor pressing member includes an elastic body positioned opposite the measurement target with the sensor in between in the first direction. The elastic body includes a side surface in a second direction intersecting the first direction that is recessed, and the side surface is recessed in a concave shape that curves in the second direction. Alternatively, the sensor pressing member is a sensor pressing member to which a sensor is attached. The sensor pressing member is configured to press the sensor in a first direction relative to a measurement target. The sensor pressing member includes: an elastic body positioned opposite the measurement target with the sensor in between in the first direction; and a pressing member positioned opposite the sensor with the elastic body in between in the first direction. The pressing member is configured to move the elastic body toward the measurement target and press the sensor against the measurement target. The elastic body includes a side surface in a second direction intersecting the first direction that is recessed, and the side surface is recessed in a concave shape that curves in the second direction.

With this configuration, the sensor pressing member includes an elastic body that sandwiches the sensor against the measurement target, and the side surface of the elastic body is recessed in a concave shape. By recessing the side surface of the elastic body in a concave shape in this manner, the side surface of the elastic body can be inhibited from protruding outward when the elastic body deforms as a result of pressing the sensor against the measurement target. With this configuration, it is possible to obtain sufficient pressing force when pressing the sensor with the sensor pressing member, achieve uniform pressing force of the sensor, and inhibit the sensor from breaking. Accordingly, by using this sensor pressing member, the measurement accuracy of the sensor can be improved.

Hereinafter, the sensor pressing member according to the embodiment (and variations thereof) of the present invention will be described with reference to the figures. The embodiment described below shows a general or specific example. The numerical values, shapes, materials, elements, the arrangement and connection of the elements, the pressing process of the sensor pressing member, the order of the steps in the pressing process, etc., shown in the following embodiment are mere examples, and therefore do not limit the scope of the present invention. The dimensions in the drawings are not necessarily precise. Moreover, the same or similar elements share the same reference signs in the drawings.

In the following description and appended drawings, the direction of alignment of the two holders (the first holder and the second holder) of the sensor holder, the direction of alignment of the two sensors (the first sensor and the second sensor), or the direction of alignment of the measurement target, the sensor, and the sensor pressing member (the elastic body) (the direction in which the sensor pressing member is pressed against the sensor) is defined as the X-axis direction. The direction in which the side surface of the elastic body is arranged is defined as the Y-axis direction.

The direction of extension of the measurement target or the up-down direction is defined as the Z-axis direction. The X-axis direction, the Y-axis direction, and the Z-axis direction are mutually intersecting directions (orthogonally intersecting directions in the present embodiment).

In the following description, for example, the X-axis positive direction indicates the direction of the X-axis arrow, and the X-axis negative direction is the opposite direction of the X-axis positive direction. The same applies to the Y-axis direction and the Z-axis direction. Hereinafter, the X-axis direction may also be referred to as the first direction, and the Y-axis direction may also be referred to as the second direction. Furthermore, expressions indicating a relative direction or orientation, such as parallel and orthogonal, include cases beyond the strict meaning of the word. For example, two directions being orthogonal includes cases in which the two directions are perfectly orthogonal as well as cases in which the two directions are substantially orthogonal, i.e., cases in which the two directions differ by a few percent, for example.

Embodiment

1 Description of Sensor Pressing Member 300 and Surrounding Members

Figure 2:
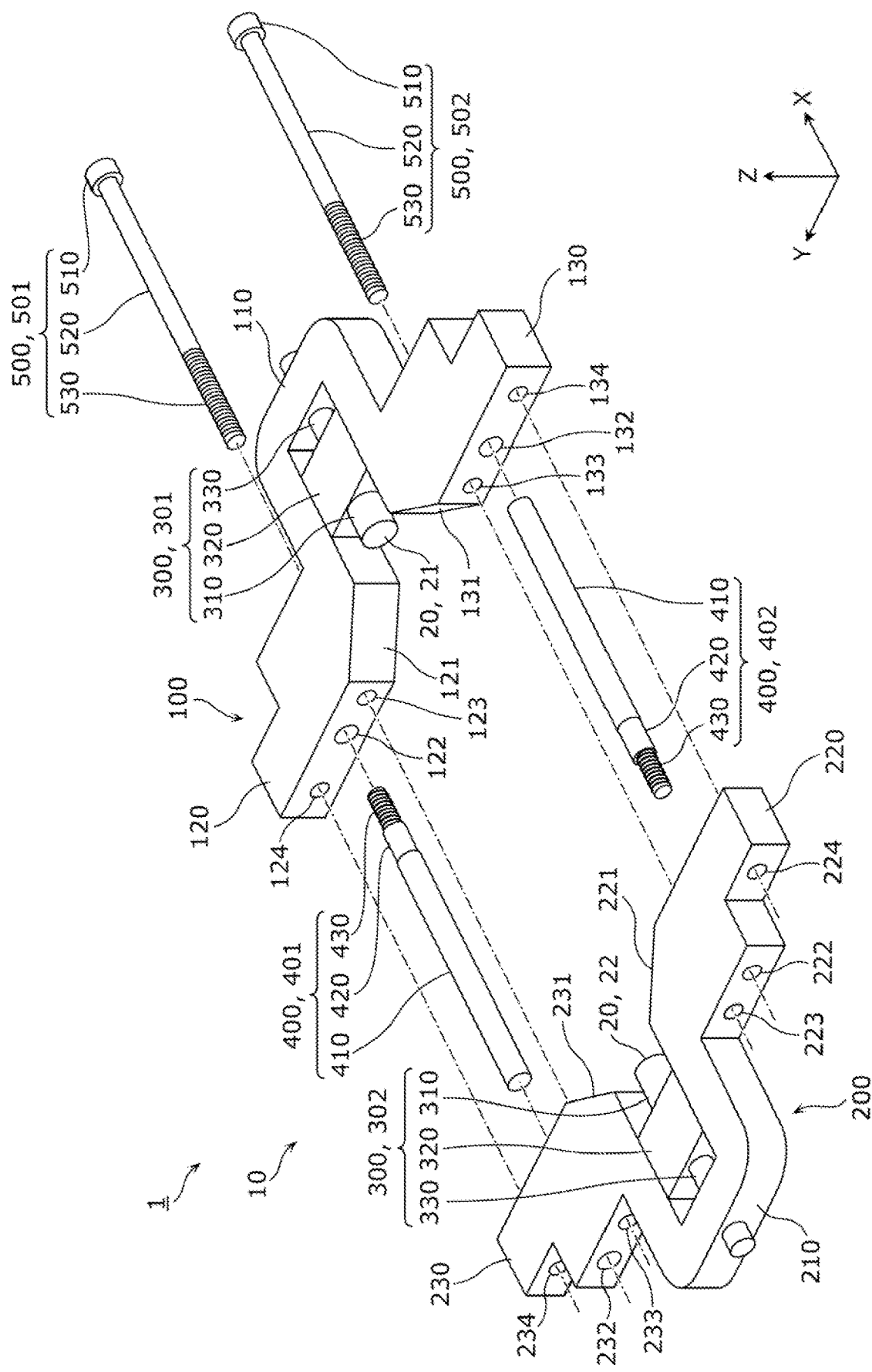
FIG. 2 is an exploded perspective view of elements of the sensor unit including the sensor pressing member according to an embodiment of the present disclosure.
Figure 3:
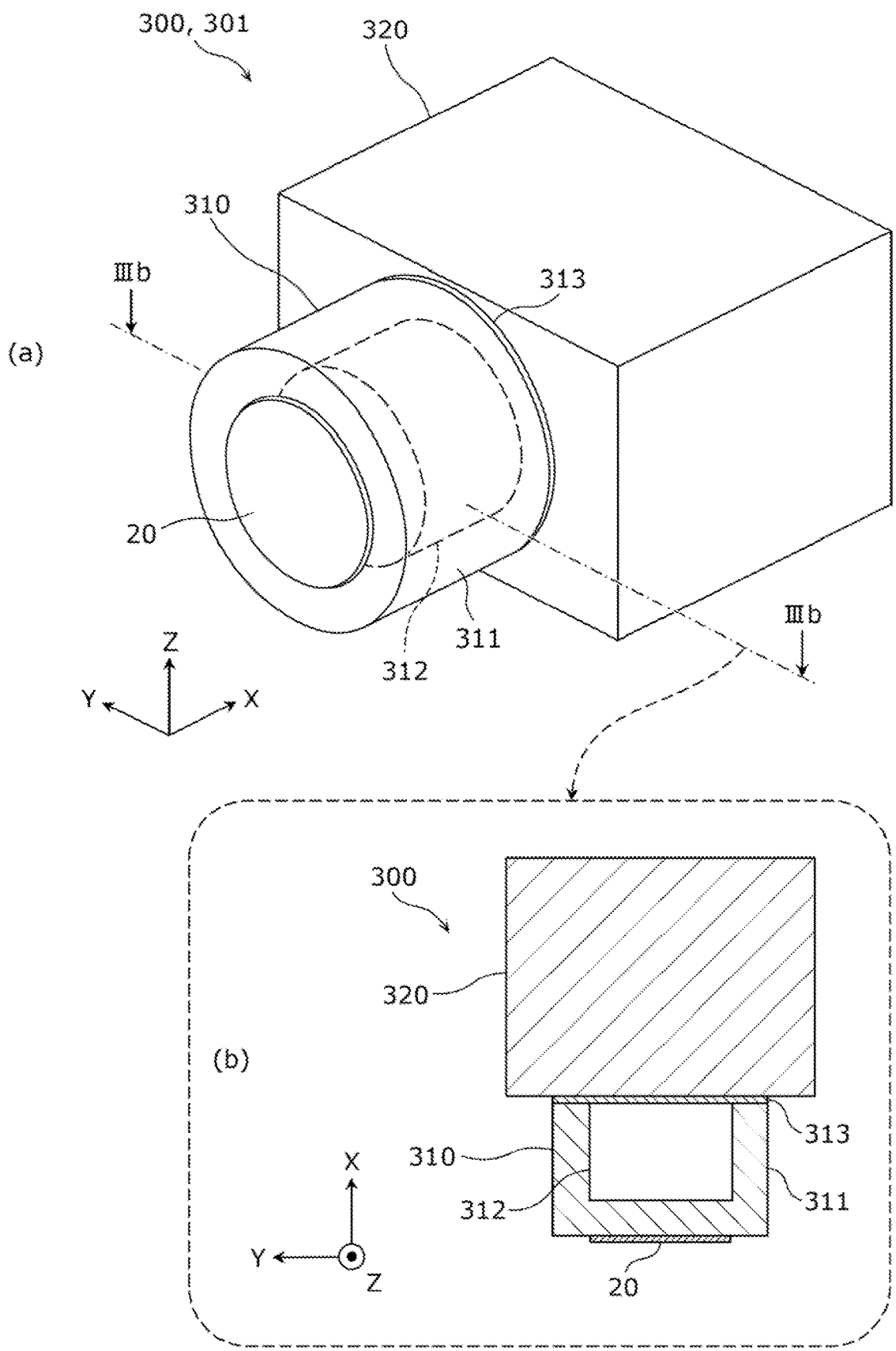
FIG. 3 includes a perspective view and a cross-sectional view of the configuration of the sensor pressing member according to an embodiment of the present disclosure.

First, the configuration of sensor pressing member 300 according to the present embodiment and its surrounding members will be described with reference to FIG. 1 through FIG. 3. FIG. 1 is a perspective view of the external appearance of sensor unit 1 including sensor pressing member 300 according to the present embodiment. More specifically, FIG. 1 illustrates sensor unit 1—which includes: sensor holder 10 including sensor pressing member 300; and sensor 20—attached to measurement target 30. FIG. 2 is an exploded perspective view of elements of sensor unit 1 including sensor pressing member 300 according to the present embodiment. FIG. 3 includes a perspective view and a cross-sectional view of the configuration of sensor pressing member 300 according to the present embodiment. More specifically, (a) in FIG. 3 is a perspective view of the configuration of sensor pressing member 300 that is located on the X-axis positive direction side in FIG. 2, and (b) in FIG. 3 is a cross-sectional view of the configuration in (a) in FIG. 3 when cut in a plane parallel to the XY plane at line IIIb-IIIb. To facilitate explanation, in FIG. 3, sensor 20 is illustrated attached to sensor pressing member 300 and feed mechanism 330 is omitted.

As illustrated in FIG. 1 and FIG. 2, sensor unit 1 includes sensor holder 10 and sensor 20, and is attached to measurement target 30 to measure the state of measurement target 30. Measurement target 30 is, for example, a member including curved side surface 30a. More specifically, side surface 30a of measurement target 30 is a curved side surface having a circular outline (outer edge shape) in a cross section when cut in a plane parallel to the XY plane. In the present embodiment, measurement target 30 is, for example, a (hollow) cylindrical pipe with an internal cavity.

Sensor 20 is, for example, a strain gauge. Stated differently, sensor unit 1 measures, for example, the strain in measurement target 30. The specific configuration of sensor 20 is not particularly limited, but examples include a foil strain gauge in which resistive elements are formed on a thin insulating film, or a friction-type strain gauge including a rigid substrate and resistive elements formed directly or indirectly on the rigid substrate. In the present embodiment, sensor unit 1 includes two sensors 20, one provided on each of both sides of measurement target 30 in the X-axis direction. More specifically, sensor unit 1 includes, as the two sensors 20, first sensor 21, which is positioned in the X-axis positive direction of measurement target 30, and second sensor 22, which is positioned in the X-axis negative direction of measurement target 30.

Sensor holder 10 is a member that holds the two sensors 20 (first sensor 21 and second sensor 22) and attaches the two sensors 20 (first sensor 21 and second sensor 22) to measurement target 30. More specifically, sensor holder 10 holds the two sensors 20 in a position where they abut measurement target 30 from both sides in the X-axis direction, and attaches the two sensors 20 to measurement target 30 while pressing the two sensors 20 against measurement target 30 from both sides in the X-axis direction. Here, sensor holder 10 includes first holder 100 and second holder 200, each including sensor pressing member 300 that presses sensor 20 against measurement target 30, and pins 400 and fixing members 500 that connect first holder 100 and second holder 200 together.

[1.1 Description of First Holder 100]

First holder 100 is a member that holds first sensor 21 among the two sensors 20. More specifically, first holder 100 is positioned in the X-axis positive direction of measurement target 30, holds first sensor 21 in a position opposing measurement target 30, and attaches first sensor 21 to measurement target 30 while pressing first sensor 21 against measurement target 30. First holder 100 includes sensor pressing member 301, which is the above-described sensor pressing member 300, first holding portion 110 that holds sensor pressing member 301, and first fixing portion 120 and second fixing portion 130 that fix to second holder 200.

[1.1.1 Description of Sensor Pressing Member 301]

First, the configuration of sensor pressing member 301 will be described in greater detail. Sensor pressing member 301 is a member to which first sensor 21 is attached at the end portion in the X-axis negative direction and which presses first sensor 21 against measurement target 30 in the X-axis negative direction (first direction). As illustrated in FIG. 2 and FIG. 3, sensor pressing member 301 includes elastic body 310, pressing member 320, and feed mechanism 330 (omitted in FIG. 3).

Elastic body 310 is an elastic member (cushioning material) that is positioned opposite measurement target 30 with first sensor 21 in between in the X-axis direction (first direction), and to which first sensor 21 is attached. Elastic body 310 can be defined as a member with high elasticity (a high elastic limit), for example, a member with an elastic modulus (elastic coefficient) or Young's modulus smaller than pressing member 320, or a member with an elastic modulus (elastic coefficient) or Young's modulus smaller than measurement target 30.

In the present embodiment, elastic body 310 is an elastic member such as silicone rubber member having a cylindrical outline, and is bonded (fixed) to the end face of pressing member 320 in the X-axis negative direction by an adhesive or the like. Note that elastic body 310 is not limited to silicone rubber, and may be made of any elastic material, such as rubber like fluorine rubber, butyl rubber, or ethylene-propylene rubber, or resin like polycarbonate (PC), polypropylene (PP), or polyethylene (PE); the material of elastic body 310 is not particularly limited. Elastic body 310 may be a transparent or translucent member so that the state of the interior of elastic body 310 and the state, such as the orientation or position, of first sensor 21 can be visually observed.

First sensor 21 is adhered (fixed) to elastic body 310 by an adhesive or the like on the end face of elastic body 310 in the X-axis negative direction. Note that a configuration in which first sensor 21 is not fixed to elastic body 310, but positioned between elastic body 310 and measurement target 30 when first holder 100 is attached to measurement target 30 is also acceptable.

As illustrated in FIG. 3, elastic body 310 includes elastic body main body 311 that includes cavity 312 therein, and cover member 313 that covers cavity 312. Elastic body main body 311 is a bottomed cylindrical member whose face at the end in the X-axis negative direction is closed and face at the end in the X-axis positive direction is open, thereby defining cavity 312 therein. Stated differently, cavity 312 is a recess recessed toward the X-axis negative direction from the face of elastic body main body 311 at the end (the end in the X-axis positive direction) opposite the face of elastic body main body 311 at the end (end in the X-axis negative direction) where first sensor 21 is attached. In the present embodiment, cavity 312 is a cylindrical space.

Cover member 313 is a disc-shaped member positioned on the face of elastic body main body 311 in the X-axis positive direction, and is bonded (fixed) to the face of elastic body main body 311 in the X-axis positive direction by, for example, an adhesive. Stated differently, cover member 313 is a cover that hermetically seals cavity 312 of elastic body main body 311. Cover member 313 is bonded (fixed) to the end face of pressing member 320 in the X-axis negative direction by, for example, an adhesive, thereby fixing elastic body 310 to pressing member 320. Cover member 313 may be made of the same material as elastic body main body 311, may be made of a different material, or may be the adhesive or sealant itself.

In the present embodiment, elastic body main body 311 and cover member 313 of elastic body 310 are formed as elastic members as described above, but cover member 313 may be formed as a non-elastic member (a member with low elasticity or elastic limit). That is, cover member 313 may be, for example, a member with an elastic modulus (elastic coefficient) or Young's modulus greater than pressing member 320, or a member with an elastic modulus (elastic coefficient) or Young's modulus greater than measurement target 30.

Pressing member 320 is a rectangular cuboid member that presses first sensor 21 against side surface 30a of measurement target 30. Pressing member 320 is moved in the X-axis negative direction by feed mechanism 330, which moves elastic body 310 in the X-axis negative direction, which in turn moves first sensor 21 in the X-axis negative direction and presses first sensor 21 against side surface 30a of measurement target 30. For example, pressing member 320 is a metal member such as an aluminum, aluminum alloy, copper, copper alloy, iron, or stainless steel member, or a resin member. Pressing member 320 is not limited to any particular shape or material.

Feed mechanism 330 moves pressing member 320 in the X-axis negative direction and applies a pressing force to pressing member 320. Feed mechanism 330 includes, for example, a shaft portion including a male threaded portion that screws into a female threaded portion of a threaded hole formed in pressing member 320, and a bushing, for example, into which said shaft portion is inserted. With this configuration, feed mechanism 330 can move pressing member 320 in the X-axis direction by the male threaded portion of the shaft portion and the female threaded portion of pressing member 320 screwing together when the shaft portion is rotated. Note that the members of feed mechanism 330 are not limited to any particular material, and feed mechanism 330 may move pressing member 320 in the X-axis direction by any sort of mechanism.

[1.1.2 Description of Members Other than Sensor Pressing Member 301]

Next, the configuration of members other than sensor pressing member 301 (first holding portion 110, first fixing portion 120, and second fixing portion 130) will be described in greater detail. First holding portion 110, first fixing portion 120, and second fixing portion 130 are integral members formed as one continuous piece which constitutes the main body of first holder 100. The main body of first holder 100 (first holding portion 110, first fixing portion 120, and second fixing portion 130) is made of resin such as acrylic resin, nylon resin, Delrin® resin, or polyetheretherketone (PEEK) resin, or metal. In the present embodiment, since first sensor 21 is pressed against measurement target 30 by sensor pressing member 301, the main body of first holder 100 may have a relatively low rigidity, and resin may be used to reduce weight, cost, etc.

First holding portion 110 is a U-shaped part of the main body of first holder 100 that is located in the central region in the Y-axis direction and includes a recess that recedes in the X-axis positive direction. Sensor pressing member 301 is arranged within this recess, and first holding portion 110 holds sensor pressing member 301 within this recess.

First fixing portion 120 is a part extending in the Y-axis positive direction from the end portion of first holding portion 110 in the X-axis negative direction and Y-axis positive direction, and fixes to second holder 200 in the X-axis direction. First fixing portion 120 includes first surface 121, first pin connection portion 122, and first fixing member connection portions 123 and 124. First surface 121 is a planar surface inclined in the X-axis direction with respect to the YZ plane, formed by rotating the Y-axis positive direction end portion of a surface parallel to the YZ plane around the Z axis toward the X-axis negative direction, and is in linear contact with side surface 30a of measurement target 30. First pin connection portion 122 is a circular through-hole extending in the X-axis direction to which pin 400 connects. First fixing member connection portions 123 and 124 are circular through-holes extending in the X-axis direction that are positioned on either side of first pin connection portion 122 in the Y-axis direction and to which fixing members 500 are connectable.

Second fixing portion 130 is a part extending in the Y-axis negative direction from the end portion of first holding portion 110 in the X-axis negative direction and Y-axis negative direction, and fixes to second holder 200 in the X-axis direction. Second fixing portion 130 includes second surface 131, second pin connection portion 132, and second fixing member connection portions 133 and 134. Second surface 131 is a planar surface inclined in the X-axis direction with respect to the YZ plane, formed by rotating the Y-axis positive direction end portion of a surface parallel to the YZ plane around the Z axis toward the X-axis positive direction, and is in linear contact with side surface 30a of measurement target 30. Second pin connection portion 132 is a circular through-hole extending in the X-axis direction to which pin 400 connects. Second fixing member connection portions 133 and 134 are circular through-holes extending in the X-axis direction that are positioned on either side of second pin connection portion 132 in the Y-axis direction and to which fixing members 500 are connectable.

[1.2 Description of Configuration of Second Holder 200]

Second holder 200 fixes to first holder 100 in a position opposite first holder 100 with measurement target 30 in between, and holds second sensor 22. More specifically, second holder 200 is positioned in the X-axis negative direction of measurement target 30, holds second sensor 22 in a position opposing measurement target 30, and attaches second sensor 22 to measurement target 30 while pressing second sensor 22 against measurement target 30. Similar to first holder 100, second holder 200 includes sensor pressing member 302, second holding portion 210 that holds sensor pressing member 302, and third fixing portion 220 and fourth fixing portion 230 that fix to first holder 100.

Here, second holder 200 has the same configuration as first holder 100 rotated 180°. Accordingly, description of the configurations of second holder 200 which are similar to first holder 100 will be simplified or omitted below.

Sensor pressing member 302 is a member to which second sensor 22 is attached at the end portion in the X-axis positive direction and which presses second sensor 22 against measurement target 30 in the X-axis positive direction (first direction). Similar to sensor pressing member 301, sensor pressing member 302 includes elastic body 310, pressing member 320, and feed mechanism 330. Elastic body 310 of sensor pressing member 302 is an elastic member (cushioning material) that is positioned opposite measurement target 30 with second sensor 22 in between in the X-axis direction (first direction), and to which second sensor 22 is attached. Pressing member 320 of sensor pressing member 302 is a rectangular cuboid member that presses second sensor 22 against side surface 30a of measurement target 30. Feed mechanism 330 moves pressing member 320 in the X-axis positive direction and applies a pressing force to pressing member 320.

As described above, since the respective elements of sensor pressing member 302 have the same configurations as the corresponding elements of sensor pressing member 301, detailed description is omitted. In other words, for example, similar to elastic body 310 of sensor pressing member 301, elastic body 310 of sensor pressing member 302 includes elastic body main body 311 that includes cavity 312 therein and cover member 313 that covers cavity 312, and elastic body 310 of sensor pressing member 302 is similar to elastic body 310 of sensor pressing member 301 in regard to the detailed configuration as well.

Second holding portion 210, third fixing portion 220, and fourth fixing portion 230 constitute the main body of second holder 200 formed in one continuous piece. Second holding portion 210 is a U-shaped part of the main body of second holder 200 that is located in the central region of the Y-axis direction and includes a recess that recedes in the X-axis negative direction. Sensor pressing member 302 is arranged within this recess, and second holding portion 210 holds sensor pressing member 302 within this recess. Third fixing portion 220 is a part extending in the Y-axis negative direction from the end portion of second holding portion 210 in the X-axis positive direction and Y-axis negative direction, and fixes to second fixing portion 130 of first holder 100 in the X-axis direction. Fourth fixing portion 230 is a part extending in the Y-axis positive direction from the end portion of second holding portion 210 in the X-axis positive direction and Y-axis positive direction, and fixes to first fixing portion 120 of first holder 100 in the X-axis direction. Third fixing portion 220 includes third surface 221, third pin connection portion 222, and third fixing member connection portions 223 and 224. Fourth fixing portion 230 includes fourth surface 231, fourth pin connection portion 232, and fourth fixing member connection portions 233 and 234.

Third surface 221 and fourth surface 231 are planar surfaces parallel to first surface 121 and second surface 131, respectively, and are in linear contact with side surface 30a of measurement target 30. Third pin connection portion 222 is a circular through-hole extending in the X-axis direction into which pin 402 is inserted. Fourth pin connection portion 232 is a circular through-hole extending in the X-axis direction into which pin 401 is inserted. Third fixing member connection portions 223 and 224 are circular through-holes extending in the X-axis direction that are positioned on either side of third pin connection portion 222 in the Y-axis direction and to which fixing members 502 are connectable. Fourth fixing member connection portions 233 and 234 are circular through-holes extending in the X-axis direction that are positioned on either side of fourth pin connection portion 232 in the Y-axis direction and to which fixing members 501 are connectable.

[1.3 Description of Configurations of Pin 400 and Fixing Member 500]

Pin 400 is a rod-shaped member extending in the X-axis direction that connects to first holder 100 and second holder 200 and positions second holder 200 with respect to first holder 100. In the present embodiment, sensor holder 10 includes two pins 400 (401 and 402), one on either side of measurement target 30 in the Y-axis direction. More specifically, each of the two pins 400 (401 and 402) includes cylindrical shaft portions 410 and 420 which extend in the X-axis direction, and male threaded portion 430 having a male thread. For example, each pin 400 (401 and 402) is a metal member such as an aluminum, aluminum alloy, copper, copper alloy, iron, or stainless steel member, or a resin member. Pins 400 (401 and 402) are not limited to any particular shape or material.

Fixing member 500 is a rod-shaped member extending in the X-axis direction that is positioned adjacent to pin 400 and connects to first holder 100 and second holder 200 to fix second holder 200 with respect to first holder 100. In the present embodiment, sensor holder 10 includes two fixing members 500 (501 and 502), one on either side of measurement target 30 in the Y-axis direction. More specifically, each of the two fixing members 500 (501 and 502) includes head portion 510, cylindrical shaft portion 520 which extends in the X-axis direction, and male threaded portion 530 having a male thread. For example, each fixing member 500 (501 and 502) is a metal member such as an aluminum, aluminum alloy, copper, copper alloy, iron, or stainless steel member, or a resin member. Fixing members 500 (501 and 502) are not limited to any particular shape or material.

2 Description of Pressing Process of Sensor Pressing Member 300

Next, the process of pressing sensor 20 against measurement target 30 using sensor pressing member 300 to measure the state (strain) of measurement target 30 with sensor unit 1 will be described in detail with reference to FIG. 4 and FIG. 5.

Figure 4:
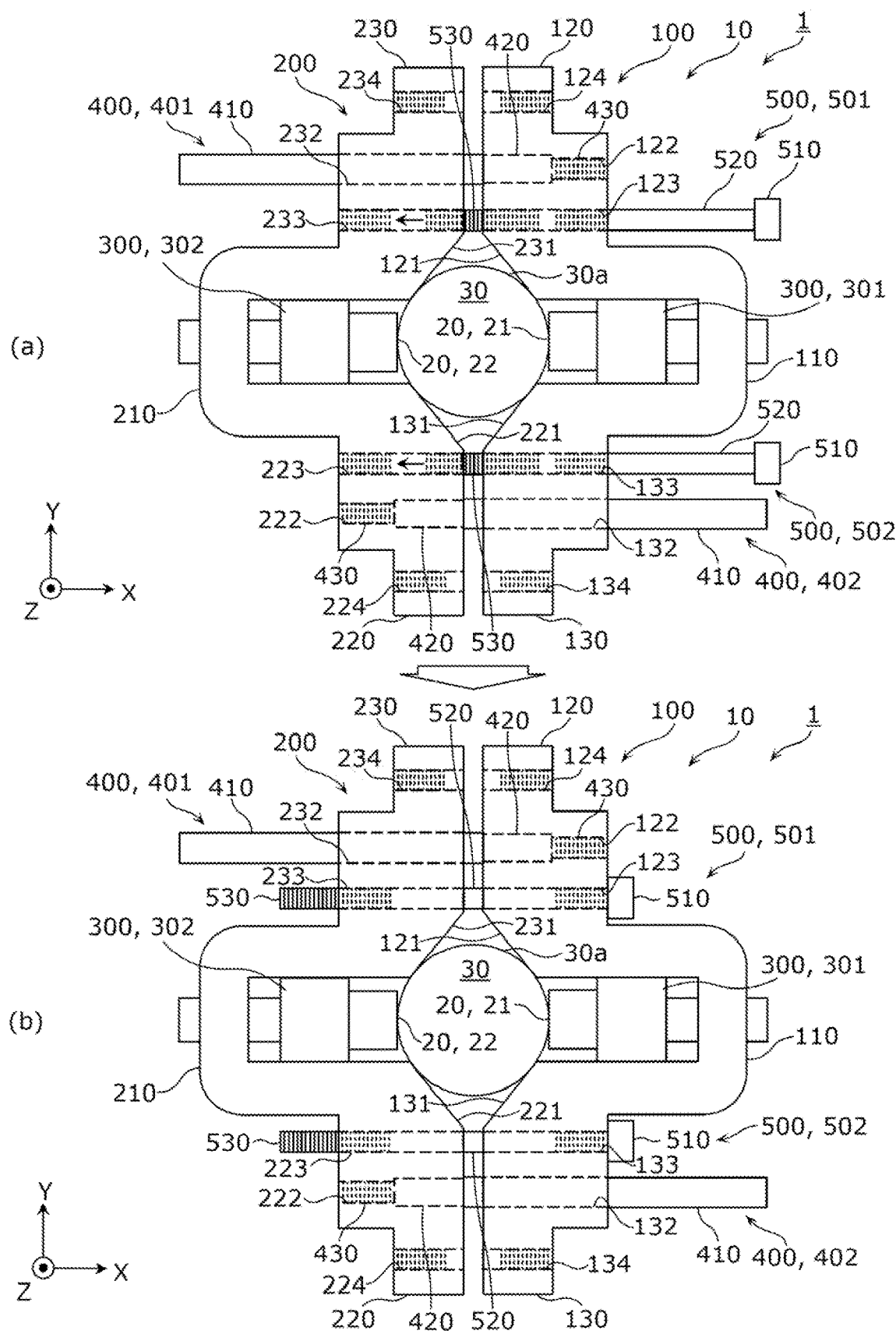
FIG. 4 is a plan view of the process of pressing a sensor against a measurement target using the sensor pressing member according to an embodiment of the present disclosure.

FIG. 4 is a plan view of the process of pressing sensor 20 against measurement target 30 using sensor pressing member 300 according to the present embodiment. More specifically, (a) in FIG. 4 illustrates the state in the middle of connecting first holder 100 and second holder 200 together using fixing members 500, and (b) in FIG. 4 illustrates the state in which first holder 100 and second holder 200 have been connected together using fixing members 500. Note that in FIG. 4, the internal cavity of measurement target 30 is omitted from the illustration to facilitate explanation.

Figure 5:
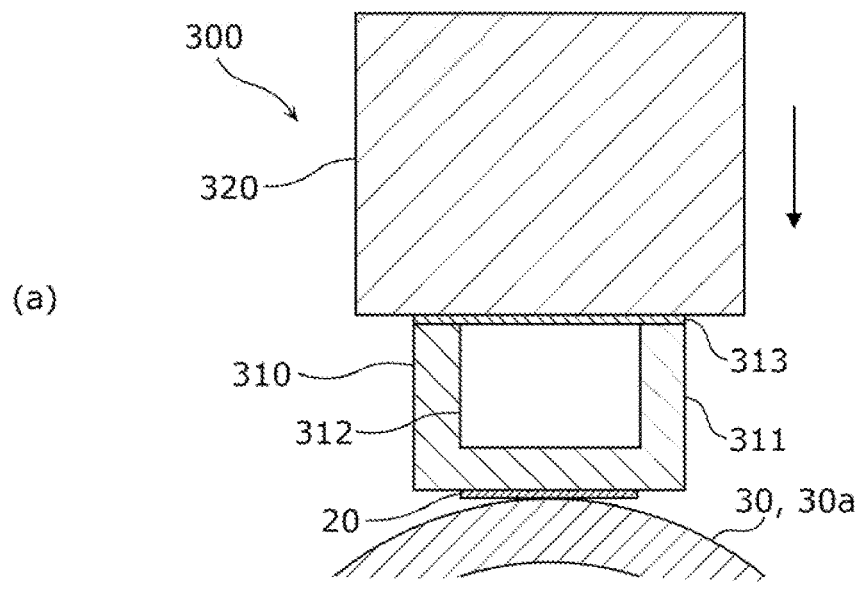
FIG. 5 is a cross-sectional close-up view of the process of pressing the sensor against the measurement target using the sensor pressing member according to an embodiment of the present disclosure.
Figure 5:
Figure 5:
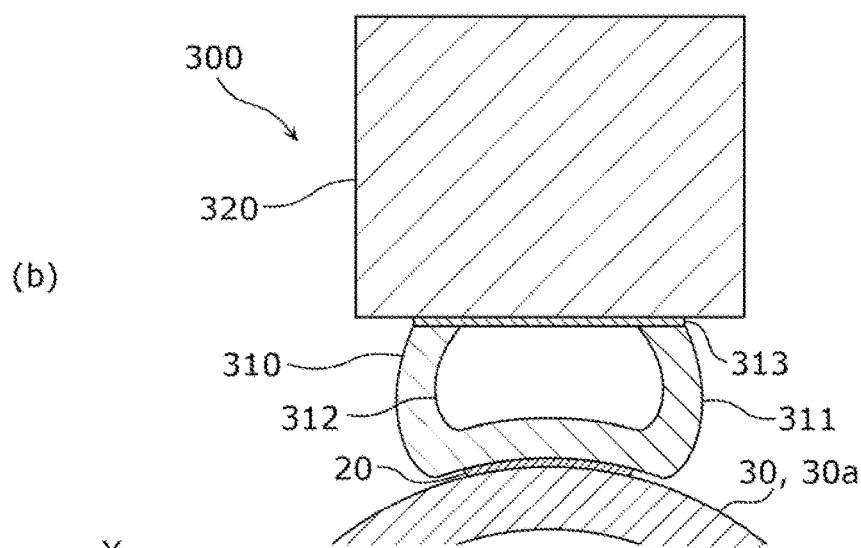
Figure 5:
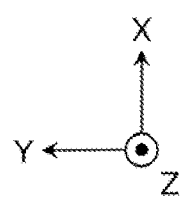

FIG. 5 is a cross-sectional close-up view of the process of pressing sensor 20 against measurement target 30 using sensor pressing member 300 according to the present embodiment. More specifically, (a) in FIG. 5 illustrates the state before pressing sensor 20 against measurement target 30 using sensor pressing member 300, and (b) in FIG. 5 illustrates the state in which sensor 20 has been pressed against measurement target 30 using sensor pressing member 300. Sensor pressing member 300 in FIG. 5 is, specifically, sensor pressing member 301, but the same applies to sensor pressing member 302. The same applies to subsequent descriptions.

First, male threaded portion 430 of pin 401 is inserted and screwed into first pin connection portion 122 of first fixing portion 120 of first holder 100, thereby fixing pin 401 to first holder 100. Similarly, male threaded portion 430 of pin 402 is inserted and screwed into third pin connection portion 222 of third fixing portion 220 of second holder 200, thereby fixing pin 402 to second holder 200. Shaft portion 410 of pin 401 is inserted into fourth pin connection portion 232 of fourth fixing portion 230 of second holder 200, and shaft portion 410 of pin 402 is inserted into second pin connection portion 132 of second fixing portion 130 of first holder 100. Pins 401 and 402 thereby position second holder 200 with respect to first holder 100.

As illustrated in (a) of FIG. 4, male threaded portion 530 of fixing member 501 first screws together with and passes through first fixing member connection portion 123 of first fixing portion 120 of first holder 100, then is inserted into fourth fixing member connection portion 233 of fourth fixing portion 230 of second holder 200. Similarly, male threaded portion 530 of fixing member 502 screws together with and passes through second fixing member connection portion 133 of second fixing portion 130 of first holder 100, then is inserted into third fixing member connection portion 223 of third fixing portion 220 of second holder 200.

Then, as illustrated in (b) of FIG. 4, male threaded portion 530 of fixing member 501 screws together with fourth fixing member connection portion 233 of fourth fixing portion 230 of second holder 200, and male threaded portion 530 of fixing member 502 screws together with third fixing member connection portion 223 of third fixing portion 220 of second holder 200. Fixing members 501 and 502 thereby fix second holder 200 with respect to first holder 100.

Here, as illustrated in (a) of FIG. 5, sensor 20 contacts the curved side surface 30a of measurement target 30, and then sensor 20 is pressed against measurement target 30 by sensor pressing member 300. More specifically, as a result of bringing second holder 200 closer to first holder 100 using fixing member 500, pressing member 320 of sensor pressing member 300 is moved toward measurement target 30. Alternatively, in sensor pressing member 300, pressing member 320 is moved toward measurement target 30 by feed mechanism 330 illustrated in FIG. 2.

This deforms elastic body 310 of sensor pressing member 300, as illustrated in (b) of FIG. 5. More specifically, elastic body main body 311 of elastic body 310 is compressed and deforms in the X-axis direction. Stated differently, since elastic body main body 311 includes cavity 312 therein, the tubular outer peripheral portion of elastic body main body 311 around cavity 312 curves so as to expand outward, and the bottom portion of elastic body main body 311 in the X-axis negative direction of cavity 312 curves along sensor 20. In this way, sensor 20 can be brought into contact with (pressed against) the curved side surface 30a of measurement target 30.

3 Description of Advantageous Effects

As described above, sensor pressing member 300 according to an embodiment of the present invention includes elastic body 310 that sandwiches sensor 20 against measurement target 30, and elastic body 310 includes cavity 312 therein. This allows for uniform pressing force on sensor 20 by sensor pressing member 300. This is described in detail below.

As illustrated in FIG. 5, elastic body 310 deforms when sensor 20 is pressed against measurement target 30 by sensor pressing member 300. If an elastic body with no inner cavity 312 is used, the pressing force on the central region of sensor 20 is greater because the elastic body is compressed more in the portion corresponding to the central region of sensor 20 than the portion corresponding to the peripheral region of sensor 20. In particular, if the elastic body is made of a relatively stiff (large elastic modulus) material, the difference in pressing force between the central region and the peripheral region will be great. If the elastic body is made of a relatively soft (small elastic modulus) material, sufficient pressing force may not be achieved, or the elastic body may expand outward too much, causing sensor 20 to break.

In contrast, with elastic body 310 that includes cavity 312 therein, cavity 312 is included in the portion corresponding to the central region of sensor 20. Therefore, unlike the elastic body described above, elastic body 310 is not compressed more in the portion corresponding to the central region of sensor 20 than the portion corresponding to the peripheral region of sensor 20, and the pressing force on the central region of sensor 20 is smaller, thus ensuring uniform pressing force on the central region and the peripheral region of sensor 20.

Uniform pressing force on sensor 20 by sensor pressing member 300 can thus be achieved. Accordingly, by using sensor pressing member 300, the measurement accuracy of sensor 20 can be improved.

4 Description of Variations

Elastic body 310 of sensor pressing member 300 is exemplified in the above embodiment as having a cylindrical outline and a cylindrical cavity 312, but this example is non-limiting. Stated differently, the shape of elastic body 310 is not limited as long as it can provide uniform pressing force on sensor 20. In this regard, shapes that elastic body 310 of sensor pressing member 300 can take will be exemplified hereinafter in the following variations. The shapes that elastic body 310 of sensor pressing member 300 can take are not limited to the above embodiment and the following variations; elastic body 310 may take various other shapes.

[4.1 Variation 1]

Figure 6A:
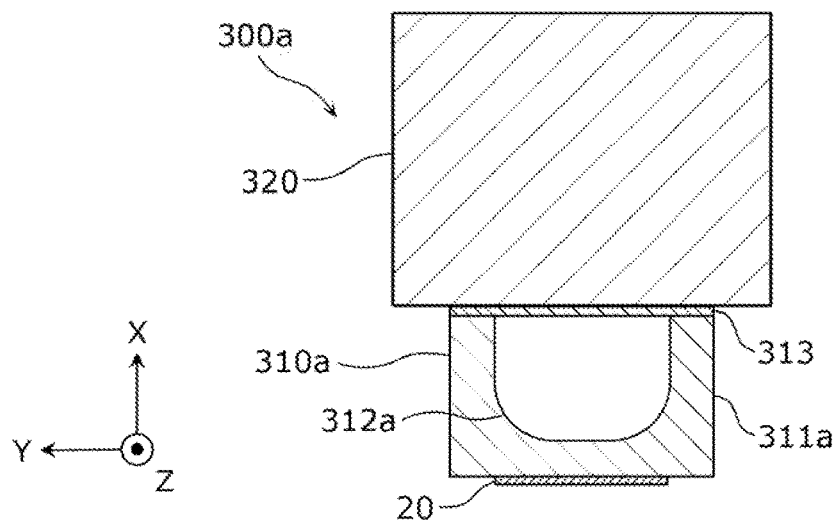
FIG. 6A is a cross-sectional view of the shape of an elastic body included in a sensor pressing member according to Variation 1 of an embodiment of the present disclosure.
Figure 6B:
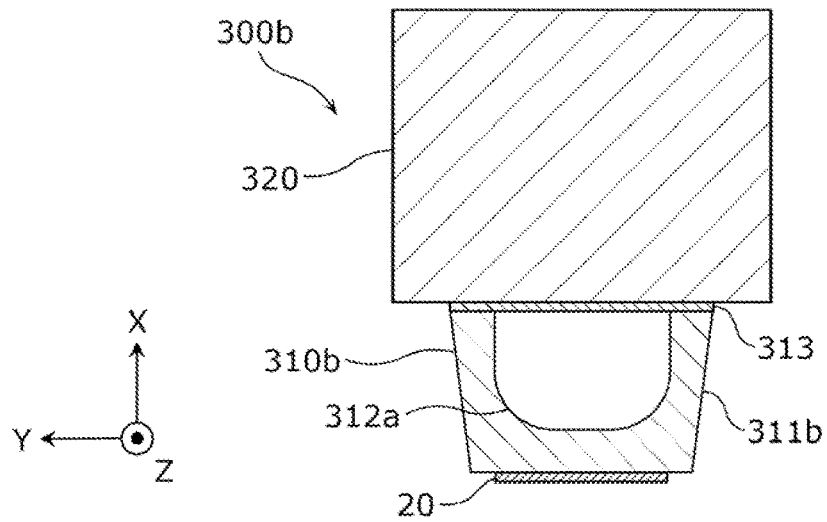
FIG. 6B is a cross-sectional view of the shape of the elastic body included in the sensor pressing member according to Variation 1 of an embodiment of the present disclosure.
Figure 6C:
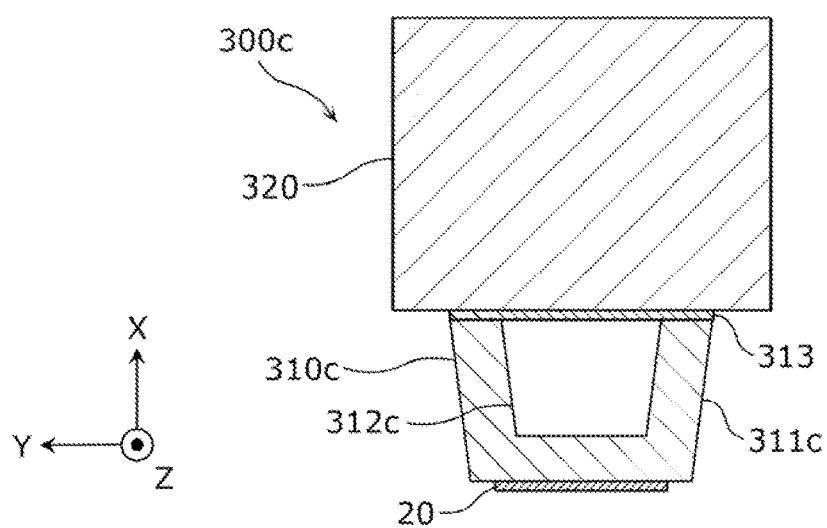
FIG. 6C is a cross-sectional view of the shape of the elastic body included in the sensor pressing member according to Variation 1 of an embodiment of the present disclosure.

First, Variation 1 of the above embodiment will be described. FIG. 6A through FIG. 6C are cross-sectional views illustrating shapes of elastic bodies 310a through 310c included in sensor pressing members 300a through 300c according to Variation 1 of the present embodiment. The views illustrated in FIG. 6A through FIG. 6C specifically correspond to (b) in FIG. 3.

As illustrated in FIG. 6A through FIG. 6C, elastic bodies 310a through 310c of sensor pressing members 300a through 300c according to the present variation include elastic body main bodies 311a through 311c instead of elastic body main body 311 of elastic body 310 of sensor pressing member 300 described in the above embodiment. As other configurations in the present variation are the same as those in the above embodiment, detailed description thereof will be omitted.

Elastic body main body 311a illustrated in FIG. 6A has a cylindrical outline just like elastic body main body 311 in the above embodiment, but the end portion of inner cavity 312a of elastic body main body 311a in the X-axis negative direction is approximately hemispherically curved. Elastic body main body 311b illustrated in FIG. 6B includes cavity 312a having the same shape as cavity 312a in elastic body main body 311a, but the outline of elastic body main body 311b has a truncated conical shape (tapered shape) that tapers in the X-axis negative direction. Elastic body main body 311c illustrated in FIG. 6C has a truncated conical shaped (tapered shaped) outline just like elastic body main body 311b, but includes therein a truncated conical cavity 312c that tapers in the X-axis negative direction.

[4.2 Variation 2]

Figure 7A:
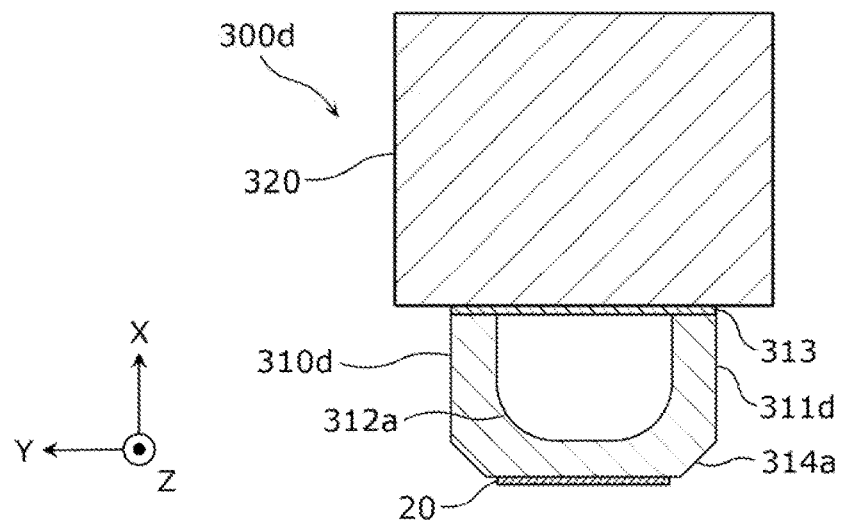
FIG. 7A is a cross-sectional view of the shape of an elastic body included in a sensor pressing member according to Variation 2 of an embodiment of the present disclosure.
Figure 7B:
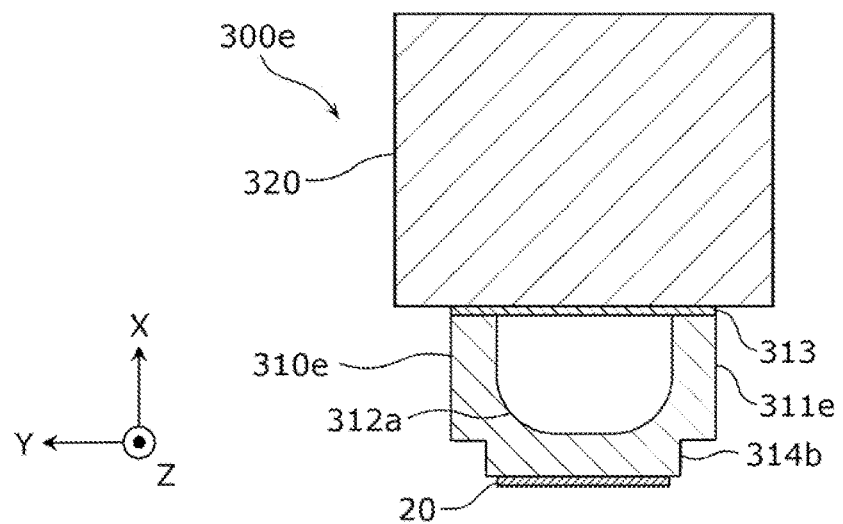
FIG. 7B is a cross-sectional view of the shape of the elastic body included in the sensor pressing member according to Variation 2 of an embodiment of the present disclosure.
Figure 7C:
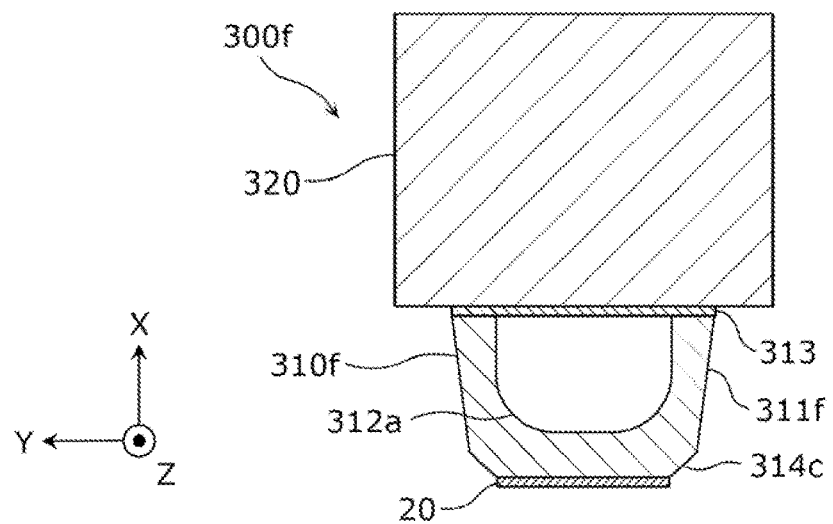
FIG. 7C is a cross-sectional view of the shape of the elastic body included in the sensor pressing member according to Variation 2 of an embodiment of the present disclosure.

Next, Variation 2 of the above embodiment will be described. FIG. 7A through FIG. 7C are cross-sectional views illustrating shapes of elastic bodies 310d through 310f included in sensor pressing members 300d through 300f according to Variation 2 of the present embodiment. The views illustrated in FIG. 7A through FIG. 7C specifically correspond to (b) in FIG. 3.

As illustrated in FIG. 7A through FIG. 7C, elastic bodies 310d through 310f of sensor pressing members 300d through 300f according to the present variation include elastic body main bodies 311d through 311f instead of elastic body main body 311 of elastic body 310 of sensor pressing member 300 described in the above embodiment. As other configurations in the present variation are the same as those in the above embodiment, detailed description thereof will be omitted.

In elastic body main bodies 311d through 311f, side surfaces 314a through 314c in a second direction (the Y-axis direction in FIG. 7A through FIG. 7C) intersecting the first direction (the X-axis direction) are recessed. More specifically, side surfaces 314a through 314c at the leading end portions of elastic body main bodies 311d through 311f in the X-axis negative direction are recessed continuously around the entire circumference.

Side surface 314a illustrated in FIG. 7A is a recessed side surface formed in the shape of a chamfered edge, around the entire circumference, at the leading end portion of elastic body main body 311d having a cylindrical outline. Side surface 314b illustrated in FIG. 7B is a recessed side surface formed in the shape of step-shaped groove, around the entire circumference, in the leading end portion of elastic body main body 311e having a cylindrical outline. Side surface 314c illustrated in FIG. 7C is a recessed side surface formed in the shape of a chamfered edge, around the entire circumference, at the leading end portion of elastic body main body 311f having a truncated conical shaped (tapered shaped) outline. Although elastic body main bodies 311d through 311f are exemplified as including therein cavity 312a having the shape described in Variation 1, the shape of cavity 312a is not particularly limited.

[4.3 Variation 3]

Figure 8A:
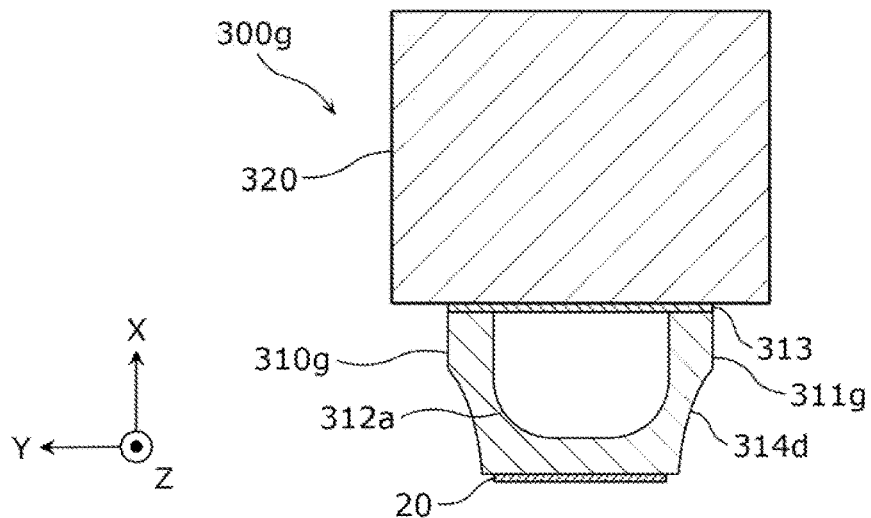
FIG. 8A is a cross-sectional view of the shape of an elastic body included in a sensor pressing member according to Variation 3 of an embodiment of the present disclosure.
Figure 8B:
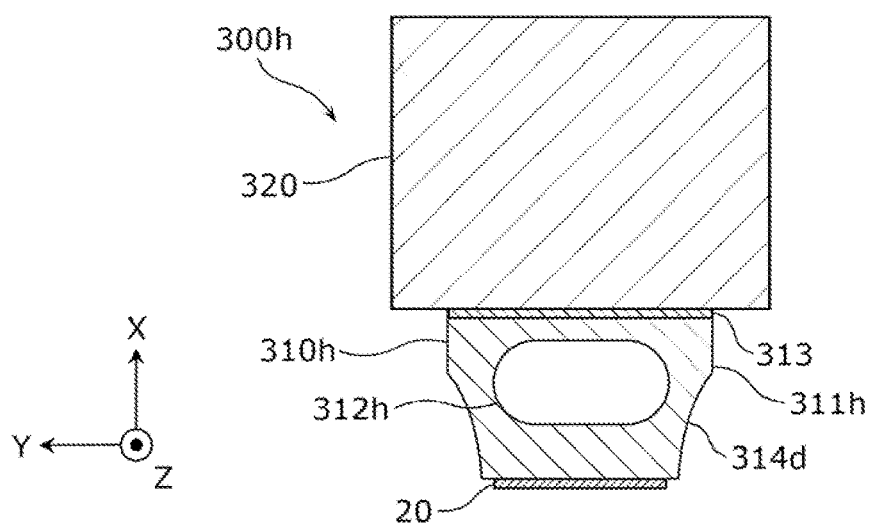
FIG. 8B is a cross-sectional view of the shape of the elastic body included in the sensor pressing member according to Variation 3 of an embodiment of the present disclosure.
Figure 8C:
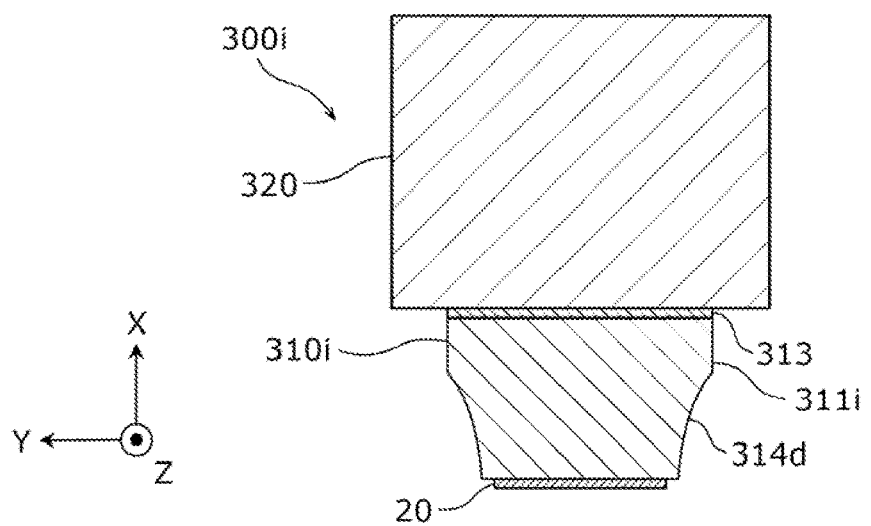
FIG. 8C is a cross-sectional view of the shape of the elastic body included in the sensor pressing member according to Variation 3 of an embodiment of the present disclosure.

Next, Variation 3 of the above embodiment will be described. FIG. 8A through FIG. 8C are cross-sectional views illustrating shapes of elastic bodies 310g through 310i included in sensor pressing members 300g through 300i according to Variation 3 of the present embodiment. The views illustrated in FIG. 8A through FIG. 8C specifically correspond to (b) in FIG. 3.

As illustrated in FIG. 8A through FIG. 8C, elastic bodies 310g through 310i of sensor pressing members 300g through 300i according to the present variation include elastic body main bodies 311g through 311i instead of elastic body main body 311 of elastic body 310 of sensor pressing member 300 described in the above embodiment. As other configurations in the present variation are the same as those in the above embodiment, detailed description thereof will be omitted.

In elastic body main bodies 311g through 311i, side surface 314d in the second direction (the Y-axis direction in FIG. 8A through FIG. 8C) intersecting the first direction (X-axis direction) is recessed in a concave shape that curves in the second direction. More specifically, side surface 314d at the leading end portions of elastic body main bodies 311g through 311i in the X-axis negative direction are recessed continuously around the entire circumference in a concave shape that curves inward in the Y-axis direction. Stated differently, side surface 314d is a recessed side surface formed by rounding the entire circumference of the leading end portion of elastic body main bodies 311g through 311i having a cylindrical outline.

Elastic body main body 311g illustrated in FIG. 8A includes therein cavity 312a having the shape described in Variation 1. Elastic body main body 311h illustrated in FIG. 8B includes cavity 312h in the central region therein. Stated differently, cavity 312h is not a recess (open space) recessed from an outer face of elastic body main body 311h, but a closed space formed in a central position in elastic body main body 311h. The shape of cavity 312h is not particularly limited. Elastic body main body 311i illustrated in FIG. 8C does not include a cavity therein.

[4.4 Variation 4]

Figure 9:
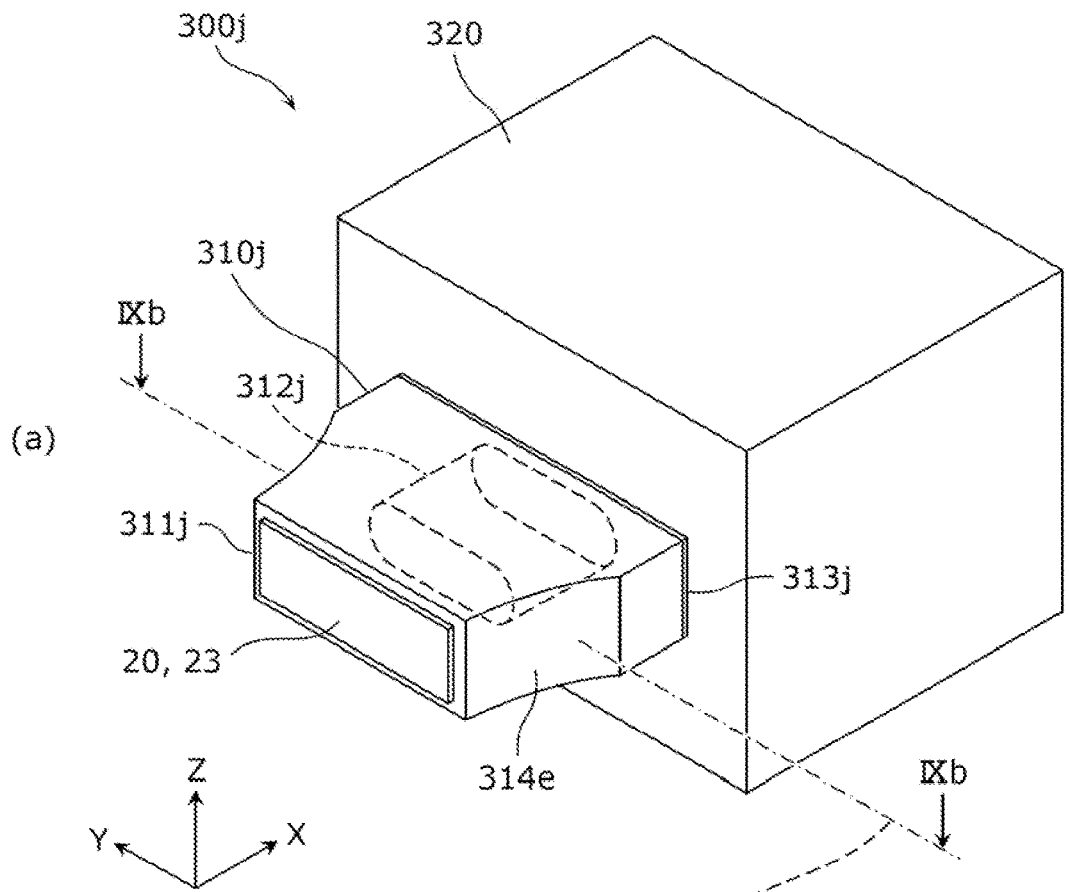
FIG. 9 includes a perspective view and a cross-sectional view of the shape of an elastic body included in a sensor pressing member according to Variation 4 of an embodiment of the present disclosure.
Figure 9:
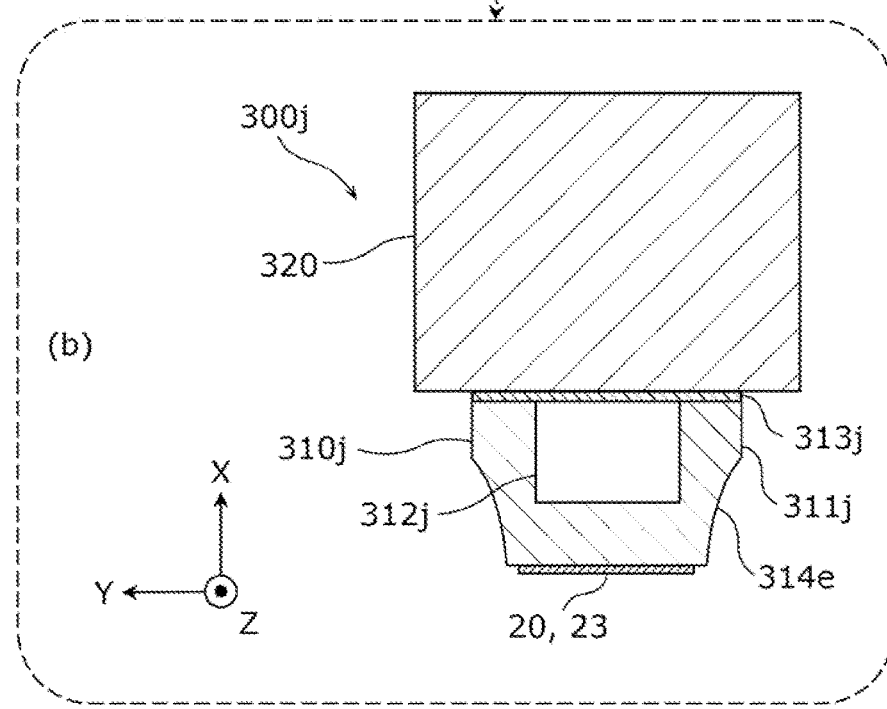

Next, Variation 4 of the above embodiment will be described. FIG. 9 includes a perspective view and a cross-sectional view of the shape of elastic body 310j included in sensor pressing member 300j according to Variation 4 of the present embodiment. More specifically, (a) in FIG. 9 is a perspective view corresponding to (a) of FIG. 3, and (b) in FIG. 9 is a cross-sectional view, corresponding to (b) of FIG. 3, of the configuration in (a) in FIG. 9 when cut in a plane parallel to the XY plane at line IXb-IXb.

As illustrated in FIG. 9, elastic body 310j of sensor pressing member 300j according to the present variation includes elastic body main body 311j and cover member 313j instead of elastic body main body 311 and cover member 313 of elastic body 310 of sensor pressing member 300 according to the above embodiment. Sensor 20 (also referred to as sensor 23) is attached to elastic body 310j (elastic body main body 311j). As other configurations in the present variation are the same as those in the above embodiment, detailed description thereof will be omitted.

Elastic body main body 311j has a slim outline characterized by a small width in the Z-axis direction and a large width in the Y-axis direction. Elastic body main body 311j includes side surface 314e in the second direction (Y-axis direction) that intersects the first direction (X-axis direction) that is recessed in a concave shape that curves in the second direction. More specifically, both end portions in the Y-axis direction of side surface 314e at the leading end portion of elastic body main body elastic body main body 311j in the X-axis negative direction are recessed in a concave shape that curves inward in the Y-axis direction. Stated differently, side surface 314e is a recessed side surface formed by rounding both sides in the Y-axis direction of the leading end portion of elastic body main body 311j having a slim rectangular cuboid outline.

Although elastic body main body 311j is exemplified as including therein cavity 312j having the shape of an elongated cylinder, cavity 312j having any sort of shape may be formed in elastic body main body 311j. Cover member 313j is flat and rectangular in shape, corresponding to the shape of the base end portion (the end portion in the X-axis positive direction) of elastic body main body 311j. Similarly, sensor 23 is flat and rectangular, corresponding to the shape of the leading end portion of elastic body main body 311j.

The shape of sensor 23 is not particularly limited, and may be an oval, an ellipse, or other shape. The outline of elastic body main body 311j including side surface 314e is not limited to a slim rectangular cuboid, and may be any shape, such as a cube or a pyramid, and the shape of cavity 312j, cover member 313j, and sensor 23 may be modified according to the shape of the outline of elastic body main body 311j. The shape of side surface 314e is not particularly limited, and may be, for example, the shape shown in Variation 2.

[4.5 Description of Advantageous Effects of Variations]

In Variations 1 through 4, since the elastic body in sensor pressing members 300a through 300h and 300j includes a cavity therein, the same advantageous effects as described in the above embodiment can be achieved. In sensor pressing members 300b through 300j, since the elastic body has a tapered outline and the side surface of the elastic body is recessed, this inhibits the side surfaces of the elastic body from protruding outward when the elastic body deforms. If the side surface of the elastic body can be inhibited from protruding outward, it is possible to obtain sufficient pressing force when pressing sensor 20 with the sensor pressing member, achieve uniform pressing force on sensor 20, and inhibit sensor 20 from breaking. This will be explained in greater detail below, using sensor pressing member 300i illustrated in FIG. 8C as an example.

Figure 10:
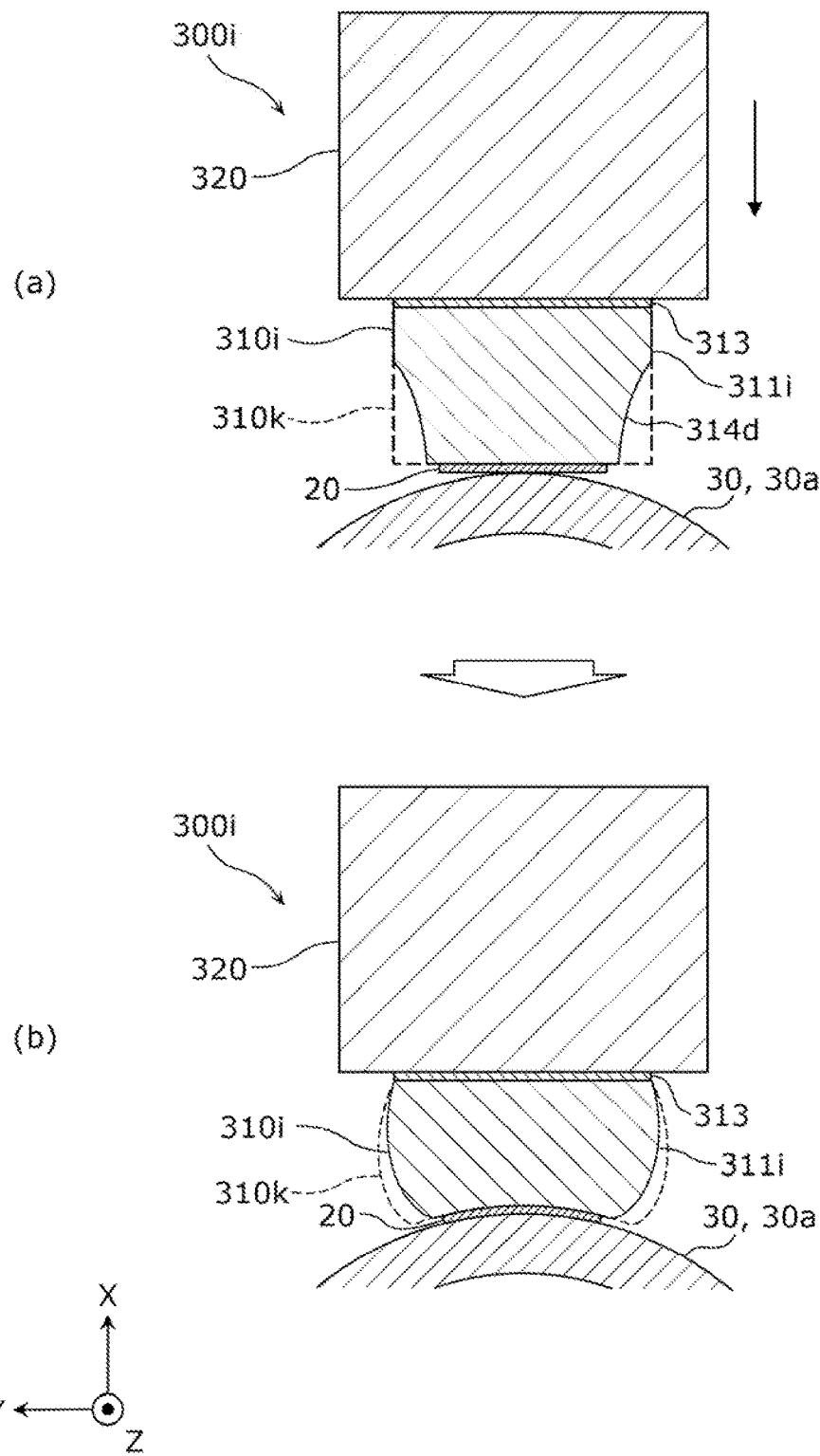
FIG. 10 is a cross-sectional close-up view of the process of pressing a sensor against a measurement target using a sensor pressing member according to a variation of an embodiment of the present disclosure.

FIG. 10 is a cross-sectional close-up view of the process of pressing sensor 20 against measurement target 30 using sensor pressing member 300i according to a variation of the present embodiment. The (a) and (b) of FIG. 10 specifically correspond to (a) and (b) in FIG. 5.

As illustrated in FIG. 10, elastic body 310i deforms when sensor 20 is pressed against measurement target 30 by sensor pressing member 300i. As illustrated in (a) of FIG. 10, elastic body 310k serves as a comparative example of a cylindrical elastic body that does not have a tapered outline and whose side surface is not recessed. In such cases, as illustrated in (b) of FIG. 10, when elastic body 310k deforms as a result of pressing sensor 20 against measurement target 30, the side surface of elastic body 310k will protrude significantly outward. If the side surface of elastic body 310k protrudes significantly outward, the pressing force on sensor 20 is dispersed, resulting in insufficient or uneven pressing force on sensor 20. If the side surface of elastic body 310k protrudes significantly outward, sensor 20 may also break.

Side surface 314d of elastic body 310i is recessed (see (a) of FIG. 10) to inhibit side surface 314d of elastic body 310i from protruding outward when elastic body 310i deforms as a result of pressing sensor 20 against measurement target 30 (see (b) of FIG. 10). With this configuration, it is possible to obtain sufficient pressing force when pressing sensor 20 with sensor pressing member 300i, achieve uniform pressing force of sensor 20, and inhibit sensor 20 from breaking. Accordingly, by using sensor pressing member 300i, the measurement accuracy of sensor 20 can be improved. Since the elastic body has a tapered outline and the side surface of the elastic body is recessed in sensor pressing members 300b through 300h and 300j as well, the side surface can be inhibited from protruding outward, thereby achieving the same advantageous effects.

Side surface 314d of elastic bodies 310g through 310i of sensor pressing members 300g through 300i described above, as well as side surface 314e of elastic body 310j of sensor pressing member 300j described above, are recessed in a concave shape. By recessing the side surface of the elastic body in a concave shape in this manner, the side surface of the elastic body can be further inhibited from protruding outward when the elastic body deforms as a result of pressing sensor 20 against measurement target 30. This makes it possible to further improve the measurement accuracy of sensor 20.

Since measurement target 30 includes a curved side surface 30a, the entire sensor 20 can be pressed from a near-vertical direction by inhibiting the outward protrusion of the side surface of the elastic body. With this as well, it possible to improve the measurement accuracy of sensor 20.

Since the above advantageous effects can be achieved by making the side surface of the elastic body tapered and/or recessed, in Variations 1 through 4, the cavity may have any shape, or may be omitted, if the side surface of the elastic body is tapered and/or recessed.

[4.6 Other Variations]

Although the sensor pressing member has been described based on the above embodiment and the variations thereof, the present invention is not limited to the above embodiment and the variations thereof. In other words, the embodiment and variations thereof disclosed herein are in all respects illustrative and non-restrictive; the scope of the present invention is defined by the claims, and includes all modifications that fall within an equivalent meaning and scope of the claims.

For example, in the above embodiment and the variations thereof, sensor 20 (first sensor 21, second sensor 22, sensor 23) is exemplified as a strain gauge. However, sensor 20 may be any sensor, such as a fiber optic sensor, an ultrasonic sensor, an acceleration sensor, or a temperature sensor. Moreover, the shape of sensor 20 is not particularly limited, and how many sensors 20 are provided is not particular limited. For example, a plurality of sensors 20 may be attached to a single sensor pressing member.

In the above embodiment and the variations thereof, measurement target 30 is exemplified as a cylindrical member including side surface 30a having a circular cross sectional outline. However, side surface 30a of measurement target 30 may be a curved side surface whose cross sectional outline is an elliptical or oval shaped curve, or a flat side surface whose cross sectional outline is square, rectangular, or some other polygonal shape. Measurement target 30 is not limited to a hollow tubular member, and may be a solid columnar member.

In the above embodiment and the variations thereof, the sensor pressing member is exemplified as including an elastic body, pressing member 320, and feed mechanism 330. However, as long as the elastic body can press sensor 20 against measurement target 30, the sensor pressing member may include pressing member 320 and feed mechanism 330 having any sort of configuration, and, alternatively, need not include pressing member 320 and feed mechanism 330. The same applies to other elements of sensor unit 1; as long as the elastic body can press sensor 20 against measurement target 30, the element may have any sort of configuration, and, alternatively, sensor unit 1 need not include the element.

In the above embodiment and the variations thereof, the elastic body of the sensor pressing member is exemplified as including an elastic body main body and a cover member. However, the elastic body need not include a cover member; the elastic body main body may be directly attached to pressing member 320.

In Variations 2 and 3, the side surface of the leading end portion of the elastic body main body included in the elastic body of the sensor pressing member is exemplified as being recessed continuously around the entire circumference. However, the elastic body main body may be recessed discontinuously around the entire circumference of the side surface of the leading end portion, and may have a configuration in which only part of the entire circumference is recessed. Similarly, in Variation 4, the side surfaces on both sides in the Y-axis direction of the leading end portion of elastic body main body included in the elastic body of the sensor pressing member are exemplified as being recessed, but the elastic body main body may have a configuration in which only one side surface among the side surfaces on both sides in the Y-axis direction is recessed. Moreover, the elastic body main body may have a configuration in which, rather than the leading end portion, the base end portion (base) on the opposite end of the leading end portion, or the central portion, is recessed.

Embodiments arrived at by arbitrarily combining elements included in the above embodiment and the variations thereof are also included within the scope of the present invention. In other words, in the elastic body of the sensor pressing member described in the above embodiment and the variations thereof, the shape of any one of the cavities of the elastic body main body, the shape of any one of the recesses of the side surface of the elastic body main body, and the shape of any one of the other parts of the elastic body main body other than the recess may be arbitrarily combined.

The present invention can be realized not only as such a sensor pressing member, but also as sensor holder 10 including a sensor pressing member, or as sensor unit 1 including a sensor pressing member (sensor holder 10) and sensor 20.

INDUSTRIAL APPLICABILITY

The present invention is applicable to a sensor pressing member to which a sensor, such as a strain gauge, is attached and which presses the sensor against a measurement target.

The invention claimed is:

1. A sensor pressing member to which a sensor is attached such that the sensor is exposed toward a measurement target, the sensor pressing member being configured to press the sensor in a first direction relative to the measurement target to bring the sensor into contact with the measurement target, the sensor pressing member comprising:
   an elastic body positioned opposite the measurement target with the sensor in between in the first direction, wherein
   the elastic body includes a cavity therein.

2. The sensor pressing member according to claim 1, wherein
   the elastic body includes a side surface in a second direction intersecting the first direction that is recessed.

3. The sensor pressing member according to claim 2, wherein
   the side surface is recessed in a concave shape that curves in the second direction.

4. A sensor pressing member to which a sensor is attached, the sensor pressing member being configured to press the sensor in a first direction relative to a measurement target, the sensor pressing member comprising:
   an elastic body positioned opposite the measurement target with the sensor in between in the first direction; and
   a pressing member positioned opposite the sensor with the elastic body in between in the first direction, the pressing member being configured to move the elastic body toward the measurement target and press the sensor against the measurement target, wherein
   the elastic body includes a cavity therein.

5. The sensor pressing member according to claim 4, wherein
   the elastic body includes a side surface in a second direction intersecting the first direction that is recessed.

6. The sensor pressing member according to claim 5, wherein
   the side surface is recessed in a concave shape that curves in the second direction.

7. A sensor pressing member to which a sensor is attached such that the sensor is exposed toward a measurement target, the sensor pressing member being configured to press the sensor in a first direction relative to the measurement target to bring the sensor into contact with the measurement target, the sensor pressing member comprising:
   an elastic body positioned opposite the measurement target with the sensor in between in the first direction, wherein
   the elastic body includes a side surface in a second direction intersecting the first direction that is recessed, and
   the side surface is recessed in a concave shape that curves in the second direction.

* * * * *